United States Patent
Mehta et al.

(10) Patent No.: US 8,323,770 B2
(45) Date of Patent: Dec. 4, 2012

(54) BREATHABLE NON-ASPHALTIC ROOFING UNDERLAYMENT HAVING TAILORABLE BREATHABILITY

(75) Inventors: Vinay Mehta, Bridgewater, NJ (US); Awdhoot Vasant Kerkar, Rockaway, NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 655 days.

(21) Appl. No.: 11/332,914

(22) Filed: Jan. 17, 2006

(65) Prior Publication Data
US 2006/0286347 A1 Dec. 21, 2006

Related U.S. Application Data

(60) Provisional application No. 60/692,028, filed on Jun. 17, 2005.

(51) Int. Cl.
*B32B 3/24* (2006.01)
*B32B 37/04* (2006.01)

(52) U.S. Cl. ........ 428/138; 428/137; 156/252; 156/256; 156/263

(58) Field of Classification Search .................. 428/138, 428/137; 156/252, 256, 263
See application file for complete search history.

(56) References Cited

U.S. PATENT DOCUMENTS

| | | | |
|---|---|---|---|
| 3,531,369 A | 9/1970 | Baumann et al. | |
| 4,073,998 A | 2/1978 | O'Connor | |
| 4,232,620 A * | 11/1980 | Kurz | 112/420 |
| 4,282,283 A | 8/1981 | George et al. | |
| 4,301,204 A | 11/1981 | McCusker et al. | |
| 4,440,816 A | 4/1984 | Uffner | |
| 4,511,619 A | 4/1985 | Kuhnel et al. | |
| 4,585,682 A | 4/1986 | Colarusso et al. | |
| 4,684,568 A | 8/1987 | Lou | |
| 4,780,362 A | 10/1988 | Ruehl et al. | |
| 5,164,258 A | 11/1992 | Shida et al. | |
| 5,230,950 A | 7/1993 | Kissel | |
| 5,291,712 A | 3/1994 | Curran | |
| 5,451,619 A | 9/1995 | Kluttz et al. | |
| 5,687,517 A | 11/1997 | Wiercinski et al. | |
| 5,691,034 A | 11/1997 | Krueger et al. | |
| 5,695,868 A | 12/1997 | McCormack | |

(Continued)

FOREIGN PATENT DOCUMENTS

EP 0104555 4/1984

(Continued)

OTHER PUBLICATIONS

Notification of Transmittal of the International Search Report and the Written Opinion for International Application No. PCT/US06/20827 to which the present application claims priority, Jun. 10, 2008.

(Continued)

*Primary Examiner* — William P Watkins, III
(74) *Attorney, Agent, or Firm* — Sills, Cummis & Gross PC

(57) ABSTRACT

A building materials composite is provided, having a first perforated coated scrim, a second perforated coated scrim, and a breathable thermoplastic film bonded to and sandwiched between the first and the second perforated coated scrims. Further, a method of manufacturing a building materials composite is provided, the method having the steps of coating a fabric, perforating the coated fabric to make a perforated coated scrim, bonding one side of the perforated coated scrim to one side of a breathable thermoplastic film, and bonding a non-woven fabric to a second side of the breathable thermoplastic film.

8 Claims, 1 Drawing Sheet

U.S. PATENT DOCUMENTS

| | | | |
|---|---|---|---|
| 5,869,414 A | 2/1999 | Fischer et al. | |
| 5,883,024 A | 3/1999 | O'Haver-Smith et al. | |
| 6,071,834 A * | 6/2000 | Martz | 442/51 |
| 6,191,221 B1 | 2/2001 | McAmish et al. | |
| 6,239,046 B1 | 5/2001 | Veiga et al. | |
| 6,300,257 B1 | 10/2001 | Kirchberger et al. | |
| 6,308,482 B1 | 10/2001 | Strait | |
| 6,350,709 B1 | 2/2002 | Veiga | |
| 6,458,724 B1 | 10/2002 | Veiga et al. | |
| 6,479,154 B1 | 11/2002 | Walton et al. | |
| 6,500,560 B1 | 12/2002 | Kiik et al. | |
| 6,586,353 B1 | 7/2003 | Kiik et al. | |
| 6,645,336 B1 | 11/2003 | Albertone et al. | |
| 6,645,565 B2 | 11/2003 | Veiga | |
| 6,645,887 B2 | 11/2003 | Kocinec et al. | |
| 6,677,258 B2 | 1/2004 | Carroll et al. | |
| 6,698,458 B1 | 3/2004 | Sollars, Jr. et al. | |
| 6,701,971 B1 | 3/2004 | Sollars, Jr. et al. | |
| 6,734,123 B2 | 5/2004 | Veiga et al. | |
| 6,740,607 B2 | 5/2004 | Veiga et al. | |
| 6,770,578 B2 | 8/2004 | Veiga | |
| 6,797,356 B2 | 9/2004 | Zupon et al. | |
| 6,864,195 B2 | 3/2005 | Peng | |
| 2002/0081924 A1 | 6/2002 | Fensel et al. | |
| 2003/0040241 A1 | 2/2003 | Kiik et al. | |
| 2003/0194566 A1 | 10/2003 | Corzani et al. | |
| 2004/0092696 A1 | 5/2004 | Vedula et al. | |
| 2004/0106345 A1 | 6/2004 | Zafiroglu | |
| 2005/0124240 A1 | 6/2005 | Porter | |

FOREIGN PATENT DOCUMENTS

| | | |
|---|---|---|
| EP | 1245620 | 10/2002 |
| WO | WO 9637668 | 11/1996 |

OTHER PUBLICATIONS

International Search Report and Written Opinion for International Application No. PCT/US06/20827 to which the present application claims priority, Jun. 10, 2008.

* cited by examiner

BREATHABLE NON-ASPHALTIC ROOFING UNDERLAYMENT HAVING TAILORABLE BREATHABILITY

CROSS REFERENCE TO RELATED APPLICATIONS

The present application claims benefit of U.S. Provisional Application No. 60/692,028 filed Jun. 17, 2005.

FIELD OF THE INVENTION

The present invention relates to a building materials composite, and more particularly to a non-asphaltic roofing underlayment that is breathable, water resistant skid-resistant, and which may be configured or tailored in order to provide a desired level of breathability.

BACKGROUND OF THE INVENTION

In the roofing industry, a roofing underlayment is typically applied to the deck of a roof prior to application of shingles or other roofing material. The primary goal of the roofing underlayment is to shield the roofing deck from asphalt (from the back surface of shingles) which otherwise would necessitate tearing up the whole deck instead of just the shingles—a costly option—at the time of reroofing. Underlayments can also help to reduce "picture framing" in which the outline of the deck panels caused by irregularities in the deck surface may be visible through the roofing material applied to the roofing deck.

In most cases, the roofing underlayment comprises a felt material composed of cellulose fibers, glass fibers and a mixture thereof that is saturated with a bituminous material such as asphalt, tar or pitch. Roofing underlayments that are saturated with a bituminous material are thick composites (typically 20 to 60 mils thick), which can be hazardous to manufacture due to the presence of a flammable bituminous material. Many of the asphaltic underlayments available in the market tend to wrinkle after being applied to a roofing deck. This is especially the case if the underlayments are rained upon. Other common problems are blowing off due to wind (when shingles are yet to be installed) or the formation of splits lengthwise in the underlayments when they are left exposed for several days.

In addition to bituminous-containing underlayments, the roofing industry has also developed non-bituminous, i.e., non-asphaltic, underlayments. The prior art non-bituminous underlayments typically include Triflex 30 (a product made by Flexia Corp. and marketed by W. R. Grace), Titanium UDL (marketed by Interwrap, Inc. of Canada), RoofTop-Guard II (marketed by Classic Products, Inc and Drexel Metals), Kaye-Flex UDL (from Kaye Industries, Florida), etc.

Currently, all non-asphaltic underlayments tend to be water-resistant but substantially non-breathable. That is, the non-asphaltic underlayments do not allow air or water vapor to pass through it. As a result, the moisture from the interior of the building is unable to escape to the exterior resulting in damage to the deck and roof over a number of years. Most of the non-asphaltic underlayments also tend to be slippery, especially when wet.

Furthermore, existing breathable underlayments are generally of three types: (1) micro-perforated or ("micro-perfed") types in which a coated fabric has mechanical perforations to allow moisture vapor to escape from the building structure; (2) microporous types in which a breathable polyolefinic film is sandwiched between two or more layers by means of thermal or ultrasonic or adhesive lamination methods; or (3) a monolithic film extruded using thermoplastic polyurethane or copolyester or its blend resins which provide breathability and waterproofness in a composite structure.

Existing micro-perfed films, however, fail the water shower test as mandated by ASTM D 4869-00. Existing microporous films and monolithic film based concepts—while providing breathability as well as waterproofness—are limited by the properties of the film itself. Hence, tailorability of properties is severely limited especially in the case of monolithic film concepts since resin blend compositions required for a particular breathability and mechanical properties can be difficult to predict. Extrusion coated film may act as a waterproof barrier, a breathable layer, as well as bonding agent between the two protective layers. However, in such cases, the breathability is severely limited (usually less than 10 perms). Additionally, such extrusion coatings tend to be prohibitively expensive.

In view of the drawbacks mentioned above with prior art non-asphaltic breathable underlayments, there is a need for providing a non-asphaltic roofing underlayment that is breathable thereby allowing moisture to escape from inside the building, while preventing water and/or moisture from entering the building. In addition, skid-resistance is a highly desirable property of an underlayment to avoid injuries from roofers sliding off of the roof. Also, sealing around nails or other roof penetrations would provide additional protection towards waterproofing the system.

SUMMARY OF THE INVENTION

The present invention provides an improved non-asphaltic underlayment useful in roof assemblies which comprises a substrate (typically non-waterproof, but can be waterproof) in which at least one layer thereof includes a breathable thermoplastic film selected from (1) a polyurethane based thermoplastic film, (2) an ethylene-methacrylate (EMA) copolymer or ethylene acrylic acid (EAA) based thermoplastic film, or (3) a micro-porous polyolefinic or polyester film that may be filled or unfilled. Combinations and/or multilayered stacks of such breathable thermoplastic films are also contemplated herein. Furthermore, the invention involves combinations of micro-perforated fabric(s) and one or more micro-porous films bonded together by known lamination techniques (such as ultrasonication, thermal, adhesive or a combination thereof, so that desired breathability can be tailored in to the composite structure. Any combination of fabrics or films can be employed.

In a preferred embodiment, the composite of the present invention comprises a breathable and substantially microporous film bonded between a breathable micro-perforated coated woven substrate and a breathable spun-bonded nonwoven layer. The coated woven scrim and spun-bonded nonwoven layer, while breathable, are typically non-waterproof. The substrate can comprise a thermoplastic polymer or copolymer or a felt material. Additionally, by tailoring the micro-perforations (in size, number and type) in the breathable coated woven scrip as micro-pores in the micro-porous film, a suitable combination of layers can be bonded together that affords the desired breathability with a high degree of flexibility and at a relatively lower cost.

The term "non-waterproof" substrate denotes a material that is pervious to water, i.e., a material that permits water permeation from the exterior of the roofing to the interior of the roofing.

The terms "breathability" or "breathable" refers to a material or materials which is permeable to water vapor or moisture having a minimum moisture vapor transmission rate (MTVR) of 3 perms, i.e., about 172 nanograms/m$^2$/Pa/sec (or 6.7 g/100 sq.in./atm/24 hours) or greater. The MTVR is measured using a standard ASTM measurement, i.e., ASTM E96-80 Proc. A or other comparable standards such as ASTM D398.

The presence of the breathable film on the substrate makes the resultant composite waterproof and yet imparts breathability of the substrate. The inventive non-asphaltic underlayment of the present invention acts as a barrier to moisture, but allows air and water vapor to pass therethrough. In addition to providing waterproofing to the deck substrate, the presence of one of the aforementioned breathable thermoplastic underlayment on a top side of the deck substrate also imparts improved skid resistance, i.e., high coefficient of resistance, against the non-asphaltic underlayment. Such an underlayment having a skid-resistant surface will also provide improved adhesion of asphaltic P&S adhesive products (like Liberty® from GAF) to the underlayment where the latter is used as a base sheet.

The term "non-asphaltic underlayment" is used in the present invention to describe a roofing composite containing no asphalt, and which is laid down on a roofing deck prior to shingle application.

The present invention also provides a method of manufacturing the non-asphaltic underlayment of the present invention. In broad terms, the method of the present invention comprises applying at least one of the above mentioned breathable thermoplastic films to at least one surface layer of a woven or non-woven, organic or inorganic substrate.

The present invention also provides a roofing system that comprises the inventive non-asphaltic, breathable underlayment and one or more shingles laid-up on the uppermost layer of the underlayment.

DETAILED DESCRIPTION

Figure 1:
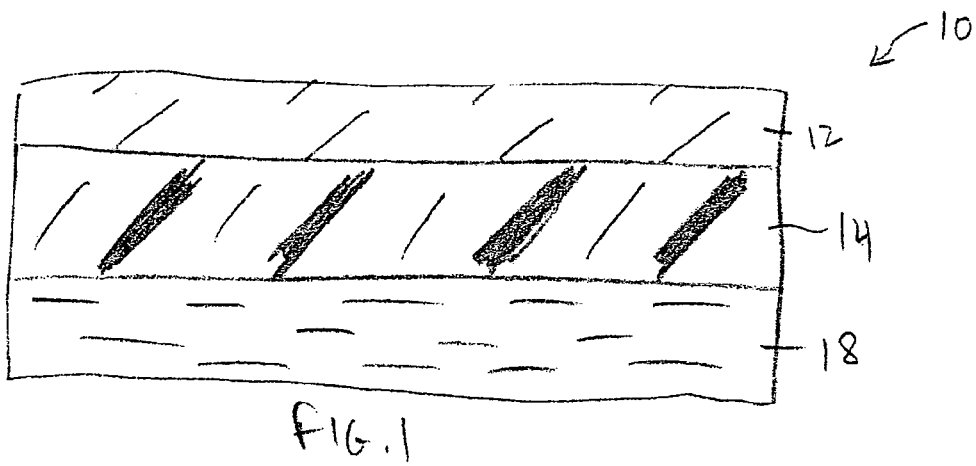
FIG. 1 is a pictorial representation (through a cross-sectional view) illustrating a non-asphaltic underlayment of the present invention.

The present invention, which provides a non-asphaltic underlayment that is breathable, waterproof and skid resistant, and which encompasses tailorable breathability characteristics, will now be described in greater detail by referring to the following description and drawings that accompany the present application. In the accompanying drawings, like and/or corresponding elements are referred to by like reference numerals.

FIGS. 1-4 of the present application illustrate various embodiments of the present invention. Specifically, FIGS. 1-4 are cross-sectional views showing the non-asphaltic underlayment 10 of the present invention.

FIG. 1 illustrates a three-layer non-asphaltic underlayment 10 in accordance with a preferred embodiment of the present invention and which comprises a breathable thermoplastic film (BTF) 14 bonded between a substrate 12 and spun-bonded or needle-punched or other types of non-woven fabrics 18 made from polypropylene, polyester, fiberglass or a blend of difference synthetic fibers.

Figure 2:
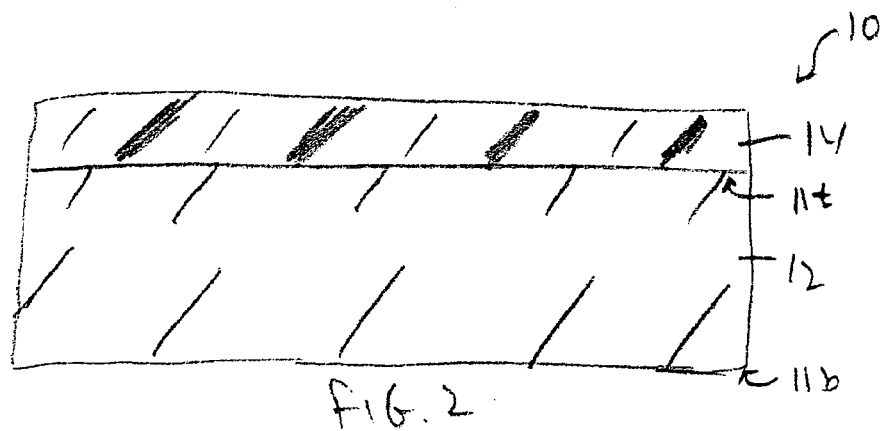
FIG. 2 is a pictorial representation (through a cross-sectional view) illustrating another non-asphaltic underlayment of the present invention.

In FIG. 2, there is illustrated a two-piece non-asphaltic underlayment 10 that comprises a substrate 12 having a breathable thermoplastic film 14 bonded to a top surface 11t of the substrate 12. The substrate 12 is typically substantially non-waterproof. In this embodiment, the top surface including the breathable thermoplastic film 14 will face in a direction opposite of the roofing deck such that one or more shingles are laid-up directly on the breathable thermoplastic film 14 of the underlayment 10. Although FIG. 1 shows the breathable thermoplastic film 14 on an upper surface of the substrate 12, it is also contemplated in the present invention to have an underlayment in which the breathable thermoplastic film 14 is bonded on a bottom surface 11b of the substrate 12.

Figure 3:
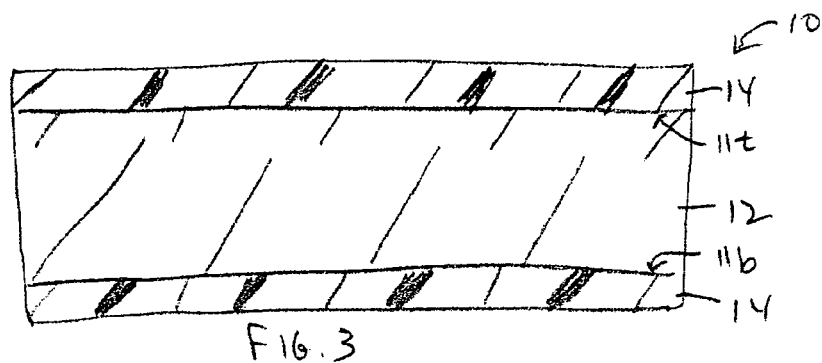
FIG. 3 is a pictorial representation (through a cross-sectional view) illustrating yet another non-asphaltic underlayment of the present invention.

FIG. 3 shows an alternative embodiment of the present invention in which the substrate 12 is sandwiched between two-breathable thermoplastic films 14 using known techniques such as thermal, ultrasonic and/or adhesive bonding. That is, the top surface 11t and bottom surface 11b of the substrate 12 both include a breathable thermoplastic film 14 thereon. FIG. 3 thus represents a three-piece underlayment.

Figure 4:
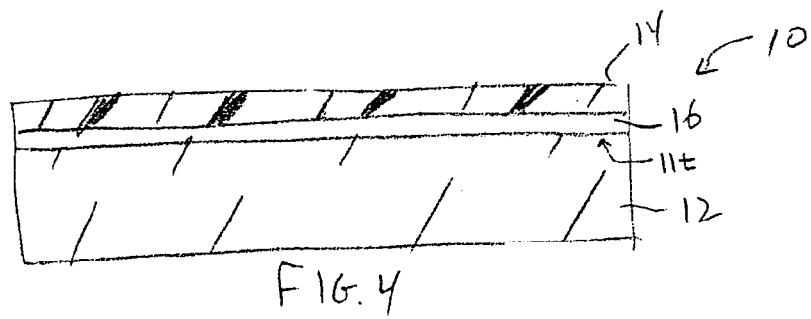
FIG. 4 is a pictorial representation (through a cross-sectional view) illustrating yet another non-asphaltic underlayment of the present invention.

In FIG. 4, there is shown an embodiment in which a tie layer 16 is present between the substrate 12 and the breathable thermoplastic film 14. The presence of the tie layer 16 improves the adhesion of the breathable thermoplastic film 14 to the substrate 12. The tie layer 16, which may also be referred to as a compatibilizer or a bonding agent, may be used in any embodiment of the present invention. If the adhesive bonding agent is non-breathable, it can be applied in discontinuous patterns, e.g. dots or squares.

The substrate 12 employed in the present invention comprises an organic or inorganic reinforcement sheet or film that is capable of withstanding high ambient temperatures. The substrate is typically, but not always, non-waterproof. The reinforcement sheet or film can comprise a thermoplastic polymer or copolymer or a felt material. The substrate may be woven or non-woven, with preference given to a coated woven substrate for imparting superior mechanical properties in both machine and cross-machine direction. The substantially non-waterproof woven or non-woven substrate of the present invention is sometimes referred to in the art as a scrim. A woven substrate is preferable since it provides greater tensile and tear strengths compared with that of comparable non-woven substrate. No asphalt or other like bituminous material is present in or on the substrate 12.

Illustrative examples of reinforcement thermoplastic polymeric materials that can be employed in the present invention as the substrate 12 include, but are not limited to: polyolefins, such as, for example, polyethylene (high density, linear low density, low density or medium density) and polypropylene; polyethylene terephthalate (PET); polyamides; polyvinyl chlorides (PVC's); polystyrenes; polyacrylics; and any copolymers thereof.

For purposes of definition herein, the term "high density polyethylene" denotes a polyethylene composition having a density of about 0.941 g/cc of higher; the term "medium density polyethylene" denotes a polyethylene composition having a density of about 0.926 to about 0.940 g/cc; and the terms "low density or linear low density polyethylene" denote a polyethylene composition having a density of about 0.90 to about 0.925 g/cc.

Of the various thermoplastic polymeric materials mentioned above, it is preferable to use a thermoplastic reinforcement material that comprises polyethylene, polypropylene or PET. The thermoplastic reinforcement material used as the substrate 12 is made using techniques well-known in the art. The substrate 12 may also be a felt material such as a cellulose fiber mat or a glass fiber mat. These types of substrates are made using techniques well known to those practicing the art.

The substrate 12 may have any thickness associated therewith, but typically the thickness of the substrate 12 is from about 6 to about 60 mils. The substrate 12 is breathable and is usually, but not always, non-waterproof.

In one embodiment, the breathable thermoplastic film 14 is a polyurethane based thermoplastic monolithic film (or thermoplastic polyurethane (TPU)). The polyurethane based thermoplastic film is a polymeric material obtained by first forming a prepolymer of polyether or polyester diols or polyols with excess diisocyanate and then chain-extending the prepolymer by reacting with a diamine or a diol. Copolymers including the TPU are also contemplated as the breathable thermoplastic film 14.

Suitable TPU's that can be employed as the breathable thermoplastic film 14 are available from Noveon (Esthane®), Merquinsa NA Inc. (Pearlthane®/Pearlcoat®), Dow Chemical Company (Pellethan®), BASF (Elastollan®), Bayer (TEXIN/DESMOPAN®) or Huntsman (AVALON® or IROGRAN®).

In another embodiment of the present invention, the breathable thermoplastic monolithic film 14 is an ethylene methacrylate (EMA) copolymer (such as Elvaloy from DuPont), a polyolefin-based EMAC (such as SP2220 from Eastman Chemical Co.), or an ethylene acrylic acid (EAA) based copolymer. These copolymer films offer similar properties as the TPU, i.e., breathable and yet waterproofing.

In yet another embodiment of the present invention, the breathable thermoplastic film 14 is a micro-porous polyolefinic (polyethylene, polypropylene and other like polyolefins including copolymers thereof) or polyester polymer which may or may not contain a filler therein.

In yet another embodiment of the present invention, the breathable thermoplastic film 14 is a multilayered stack that includes any combination of above-mentioned breathable thermoplastic materials.

The underlayment in accordance with the various embodiments of the present invention may take on, but are not limited to, the following forms and layer combinations: (a) micro-perforated coated woven scrim/micro-porous film/spun-bonded non-woven layer, (b) micro-perforated coated non-woven scrim/micro-porous film/micro-perforated coated woven layer, (c) micro-perforated coated woven scrim/micro-porous film.

The combinations of micro-perforated fabric(s) and one or more micro-porous films may be bonded together by an adhesive or by thermal bonding, however, other known lamination techniques (such as ultrasonication, adhesive or a combination thereof) may be used, such that desired breathability can be tailored in to the composite structure. In the event that that such an adhesive is non-breathable, it can be applied in a discontinuous manner such as dots or squares, in which case the specific pattern with the number of such dots per unit area, and the spacing between them can be varied to design required breathability.

The thickness of the breathable thermoplastic film 14 may vary, but typically it is from about 0.5 to about 10 mils, with a thickness from about 1 to about 3 mils being more highly preferred. Thicker breathable thermoplastic films 14 are also contemplated.

In embodiments in which a tie layer 16 is present, the tie layer 16 comprises a bonding agent, such as, for example, a polyamide, an ethylene copolymer such as ethylene vinyl acetate (EVA), ethylene ethyl acrylate (EEA), ethylene acrylic acid (EAA), ethylene methyl acrylate (EMA) (such as SP2207, SP2403, or SP1307 grades from Voridian) and ethylene normal-butyl acrylate (ENBA). However, the most-preferred material as a tie layer 16 is EMA having a methyl acrylate level of about 18% or greater.

The tie layer 16 may be applied during formation of the substrate by including the bonding agent within the polymerization process, during the formation of the breathable thermoplastic film, or after substrate formation using one of the methods described below.

The breathable thermoplastic film 14 may also be bonded to the substrate 12 by chemical bonding, mechanical bonding and/or thermal bonding. The breathable thermoplastic film 14 may also be bonded using a nip such as that generated by a pair of heat calendar roll, or by using an ultrasonication chamber.

In the case of polyolefinic based materials having filler induced micro-pores, those materials are made breathable upon stretching the film under appropriate conditions well known to those well versed in the art. In one embodiment, polypropylene with $CaCO_3$ fillers having micro-pores coated onto a glass mat is envisaged as a roofing underlayment that is breathable and yet waterproof. In order to improve the adhesion between filled or unfilled extrusion coated polyolefins such as polyethylene (PE) or polypropylene (PP) and glass mat—necessary for enhanced abrasion resistance—the following specific options are envisaged:

(1) Maleic anhydride grafted PP (blended up to 10%, but more preferably up to 5%) to regular PP batch. MAgPP is commercially available from DuPont (as Fusabond®), Atofina (as Lotadar™ or Orevac™) and other vendors.

(2) Titanate or Zirconate coupling agents such as those available from Kenrich Petrochemicals, Inc. for improving the PP (preferably with fillers such as carbon black) bond to glass fibers. Ken-React's CAPS NZ 12/L (zirconate based) or CAPS L 38/L (titanate based) at 5% CAPS by weight of PP or lower, but more preferably 1 to 3% by weight can be used. Slight lowering of extrusion temperatures (typically about 10%) to create high shear for reactive compounding and dispersion of the titanate or zirconate masterbatch in the PP melt so that fiberglass mat can be subsequently coated uniformly.

(3) In addition to (1) and (2) above, additional silane treatment to glass may become necessary as intimate mixing of glass fibers with PP (as in an extruder) cannot be done in composite process described herein. The well-known silane agents are aminoalkyltrialkoxysilanes such as 1-dimethylaamino-2-propanol or 2-dimethylamino-2-methyl-1-propanol or 3-aminopropyl triethoxysilane in the presence of a salifying agent (KOH) and an emulsifier such as polyoxyethylene octylphenyl ether.

Skid-resistance of polyolefinic coated underlayments can be increased by incorporating ethyl-vinyl acetate (EVA) or modified EVA such as maleic anhydride grafted EVA (like Fusabond C series sold by DuPont) up to 10% (most preferably 1-3%) by weight of PP.

The underlayments of the present invention can also be coated or sprayed with an algaecide such as, for example, zinc powder, or copper oxide powder; a herbicide; an antifungal material such as Micro-Chek 11P; an antibacterial material such as Micro-Chek 11-S-160; a surface friction agent such as Byk-375, a flame retardant material such as ATH (aluminum trihydrate) available from, e.g., Akzo Chemicals and antimony oxide available from, e.g., Laurel Industries and/or a coloring dye such as T-1133A and iron oxide red pigments, and other products which can impart specific surface functions. The Micro-Chek products are available from the Ferro Corporation of Walton Hills, Ohio. Byk-375 may be obtained from Wacker Silicone Corporation of Adrian, Mich. and T-1133A is sold by Abco Enterprises Inc. of Allegan, Mich. The additional coatings of, e.g., water repellent material, antifungal material, antibacterial material, etc., may be applied to one or both sides of underlayment of the present invention.

The waterproof and breathable underlayment 10 of the present invention is used as a component of a roofing system together with one or more conventional shingles. In this application, the underlayment of the present invention is first applied to the roofing deck and then secured thereto using securing means well-known to those skilled in the art, such as by nail or staple application. Next, one or more shingles are laid-up on the uppermost layer of the underlayment 10 and thereafter the shingle is secured to the roofing deck. The lay up and securing steps are well-known to those skilled in the art. Types of shingles that can be used in the present invention include, but are not limited to: asphalt-containing single or multi-ply organic or inorganic shingles.

It is anticipated that the micro-perfed coated woven scrim layer 12 will be applied on a roof deck with layer 12 facing the roof and non-woven layer 18 as the exposed surface upon which roofers will walk. Underlayment 10 applied in this manner provides a satisfactory frictional surface for roofer to walk on. Alternatively the underlayment 10 can be flipped with micro-perfed coated scrim layer 12 on the upper exposed side coated with an anti-skid substance.

The micro-perforations in underlayment 10 of the present invention are typically formed using pinned perforating rollers. The present invention is not, however, limited in the manner in which the micro-perforations are formed and other methods for perforation are contemplated, including: (1) perforation by heat embossing at temperatures over the melting point of the fiber; (2) perforation by friction calendaring between an appropriately engraved and a smooth roller; (3) perforation by slitting and extension perpendicular to the slits; (4) perforation by passing male-/female rollers; (5) hot needle perforation; and (6) perforation by water jets onto suitable supporting means such as coarse mesh screens or perforated drainage drums with projections in order to provide clear holes. The micro-perforations can be easily manipulated in shape (e.g., oval square, circular, etc.), size (e.g., diameter, area) and density so as to control the degree of breathability of underlayment 10.

Other factors that influence the extent of perforations are pin density, diameter of the pins at the tips, pin height, and pin profile from the apex to the base. Additionally, the pin tip (apex) can be of different shapes (instead of circular). Alternatively, micro-perfing is possible by electrostatic perforation (ESP) or laser-based techniques. The location of the pin roller can be varied as well. The pin roller may be temperature controlled depending on the line speed and material being perforated. A bank of pin rollers may be employed if necessary. The substrate, fabric or film may run against a support roller to provide additional stability and consistency of perforations.

While the present invention has been particularly described and illustrated with respect to preferred embodiments thereof, it will be understood by those skilled in the art that the foregoing and other changes in forms and details may be made without departing from the spirit and scope of the present invention. It is therefore intended that the present invention is not limited to the exact forms and details described and illustrated.

The invention claimed is:

1. A non-asphaltic roofing underlayment, comprising:
   a first perforated coated scrim;
   a second perforated coated scrim; and
   a non-perforated, breathable and waterproof monolithic or microporous thermoplastic film bonded to and sandwiched between the first and second perforated coated scrims, said thermoplastic film bonded to and sandwiched between the first and second perforated coated scrims via thermal bonding or ultrasonication;
   wherein each of the first perforated coated scrim and the second perforated coated scrim comprises a material chosen from woven fibers, polyolefins, polyethylene terephthalate (PET); polyamides, polyvinyl chlorides (PVC), polystyrenes, polyacrylics, polypropylene, polyester, fiberglass, cellulose fiber and any copolymers or blends thereof;
   wherein the breathable thermoplastic film is selected from the group consisting of a polyurethane based thermoplastic film, an ethylene methacrylate copolymer based thermoplastic film, an ethylene acrylic acid based thermoplastic film, a micro-porous polyolefinic film and a micro-porous polyester film; and
   wherein each of the first perforated coated scrim and the second perforated coated scrim has a thickness of about 6 to about 60 mils, and wherein perforations in the first perforated coated scrim or the second perforated coated scrim or both can be varied in number, size or shape or a combination of any of these so as to allow tailoring of breathability of the non-asphaltic roofing underlayment when applied upon a roof surface.

2. The non-asphaltic roofing underlayment of claim 1, wherein the non-asphaltic roofing underlayment is used as a weather barrier.

3. The non-asphaltic roofing underlayment of claim 1, wherein the first and second perforated coated scrims are bonded to the breathable thermoplastic film by lamination techniques selected from the group consisting of ultrasonication, thermal, or a combination thereof.

4. A method of manufacturing a non-asphaltic roofing underlayment, comprising the steps of:
   coating a fabric to provide a perforated coated scrim;
   bonding one side of the perforated coated scrim to one side of a non-perforated, breathable and waterproof monolithic or microporous thermoplastic film via thermal bonding or ultrasonication; and
   bonding a non-woven fabric to a second side of the breathable and waterproof thermoplastic film via thermal bonding or ultrasonication.

5. The method of manufacturing a non-asphaltic roofing underlayment of claim 4, wherein the perforated coated scrim and the non-woven fabric are simultaneously bonded to the first and second sides of the breathable thermoplastic film, respectively.

6. The method of manufacturing a non-asphaltic roofing underlayment of claim 4, further comprising:
   bonding a second non-woven fabric to another side of the perforated coated scrim.

7. A method of manufacturing a non-asphaltic roofing underlayment, comprising the steps of:
   coating a first fabric and a second fabric;
   perforating the first and second coated fabric to make a first and a second perforated coated scrims; and
   bonding the first and second perforated coated scrims to a first side and a second side of a non-perforated, breathable and waterproof monolithic or microporous thermoplastic film, respectively; wherein the bonding is done by lamination techniques selected from the group consisting of ultrasonication, thermal, or a combination thereof.

8. A method of tailoring the breathability of a non-asphaltic roofing underlayment, comprising the steps of:
coating a first fabric and a second fabric;
perforating the first and second coated fabric to make a first and a second perforated coated scrims;
bonding the first and second perforated coated scrims to a first side and a second side of a non-perforated, breathable and waterproof t monolithic or microporous thermoplastic film, respectively; wherein the bonding is done by lamination techniques selected from the group consisting of ultrasonication, thermal, or a combination thereof; and
varying the perforations in the first perforated coated scrim or the second perforated coated scrim in number, size, shape or density or a combination of any of these to provide a desired level of breathability.

* * * * *